United States Patent
Mizukoshi

(10) Patent No.: US 7,684,796 B2
(45) Date of Patent: Mar. 23, 2010

(54) MOBILE COMMUNICATION SYSTEM, MANAGEMENT AGENT APPARATUS, AND SERVER FUNCTION MOVING METHOD

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 978 days.

(21) Appl. No.: 11/293,182

(22) Filed: Dec. 5, 2005

(65) Prior Publication Data

US 2006/0120340 A1 Jun. 8, 2006

(30) Foreign Application Priority Data

Dec. 8, 2004 (JP) .............................. 2004-354771

(51) Int. Cl.
*H04W 4/00* (2009.01)
(52) U.S. Cl. .................... 455/433; 455/428; 455/435.1; 370/331
(58) Field of Classification Search ... 455/432.1–435.3, 455/445, 403, 456.1–457, 428; 370/338, 370/352, 395.21, 395.52, 349, 331–332, 370/400–401, 328; 709/220–223, 226–229; 710/10
See application file for complete search history.

(56) References Cited

U.S. PATENT DOCUMENTS 7,298,720 B2 * 11/2007 Yamada et al. ............... 370/331

2002/0059452 A1 5/2002 Yokota et al.
2003/0093553 A1 5/2003 Le et al.
2004/0196821 A1 * 10/2004 Haddad et al. ............... 370/349

FOREIGN PATENT DOCUMENTS

| JP | 2002-094557 A | 3/2002 |
| JP | 2003-208371 | 7/2003 |
| WO | WO 03/088615 A2 | 10/2003 |
| WO | WO 2004/004281 A1 | 1/2004 |

OTHER PUBLICATIONS

Masahiko Mizutani et al., Personal Storage System, IPSJ SIG Technical Report, Oct. 23, 2003, pp. 37-42.

* cited by examiner

*Primary Examiner*—Kamran Afshar
(74) *Attorney, Agent, or Firm*—Foley & Lardner LLP

(57) ABSTRACT

A mobile communication system includes a management agent, server, and temporary server. The management agent manages the destination of a mobile node. The server serves as a communication partner of the mobile node. The temporary server has a network function equivalent to that of the server. The management agent includes a position registration unit which registers position information of the destination of the mobile node when the mobile node moves, and a server function relocation unit which sets the temporary server as the communication partner of the mobile node instead of the server. A management agent apparatus and server function moving method are also disclosed.

23 Claims, 16 Drawing Sheets

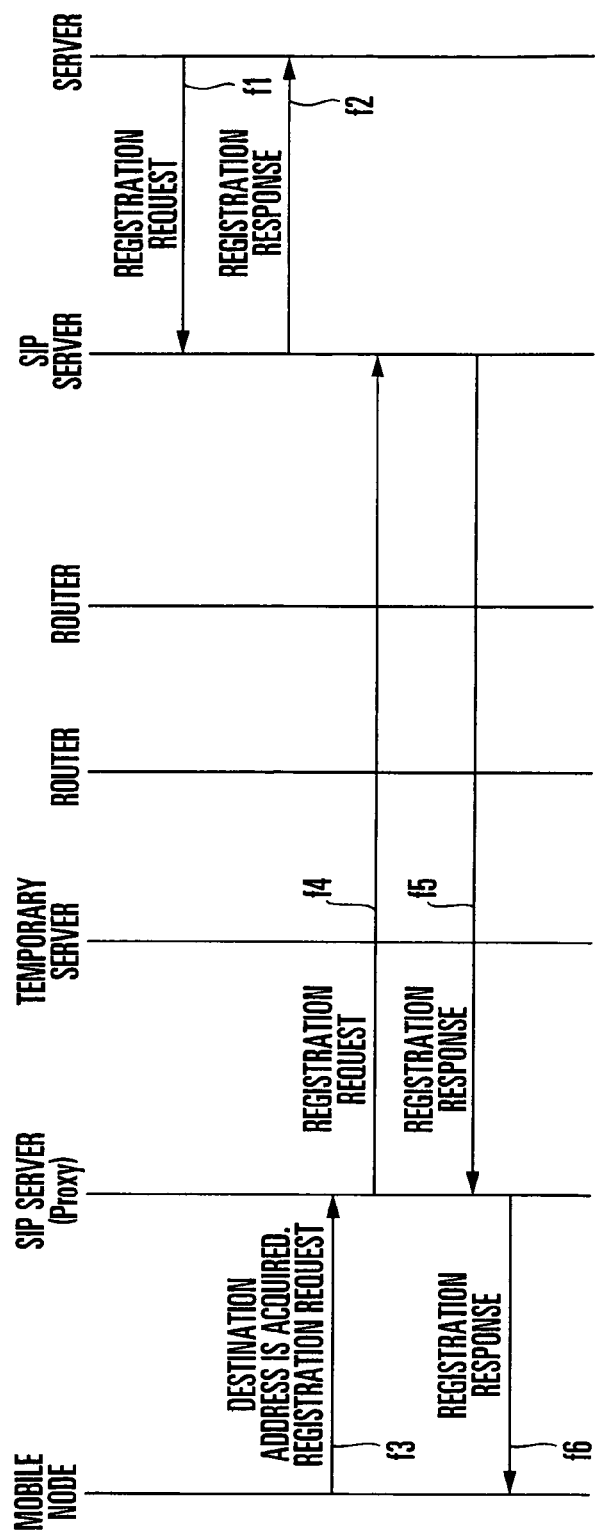
F I G. 15

MOBILE COMMUNICATION SYSTEM, MANAGEMENT AGENT APPARATUS, AND SERVER FUNCTION MOVING METHOD

BACKGROUND OF THE INVENTION

The present invention relates to a mobile communication system, management agent apparatus, and server function moving method and, more particularly, to a method of connecting a mobile node to a network after the mobile node moves in the mobile communication system.

For Mobile IP (Internet Protocol) in a conventional mobile communication system of this type, when a mobile node (MN) moves and is connected to a foreign network, as shown in FIG. 14, it acquires the care-of address CoA (Care of Address) of the foreign network, and requests a home agent (HA) to register the position of the mobile node (e1 and e2 in FIG. 14). The home agent registers the home address HoA (Home of Address) and CoA of the mobile node (e3 and e4 in FIG. 14) (see, e.g., reference 1 (Japanese Patent Laid-Open No. 2002-094557)).

For SIP (Session Initiation Protocol), the mobile node moves, acquires an address in a foreign network, and transmits a registration request via an SIP server (proxy), as shown in FIG. 15 (f3 and f4 in FIG. 15). Then, the mobile node registers the destination address in the SIP server having a registration function (f5 and f6 in FIG. 15). Assume that a server serving as a communication partner of the mobile node is separately registered in the SIP server (f1 and f2 in FIG. 15).

When the mobile node and server are managed by separate SIP servers, the server serving as a communication partner of the mobile node is registered in the SIP server of the server, as shown in FIG. 16 (g1 and g2 in FIG. 16). The mobile node moves, acquires an address in a foreign network, and transmits a registration request via the SIP server (proxy) (g3 and g4 in FIG. 16). Then, the mobile node registers the destination address in the SIP server having the registration function for the mobile node (g5 and g6 in FIG. 16).

By this processing operation, when moving to a foreign network, the mobile node acquires an address in the foreign network, registers the address in the home agent or SIP server having the registration function, and thereby establishes a session with the server.

In the conventional mobile communication system described above, a mobile node 3 cannot select any server optimal for a destination, as shown in FIG. 17. The transmission delay to a server 1 is large, the throughput is low, the response time is long, and it is difficult to provide information corresponding to the destination.

To solve these problems, some conventional mobile communication systems employ broadcast and anycast as means for selecting a server corresponding to a destination. However, the broadcast method requires a dedicated server in a foreign network. The anycast method cannot establish any TCP (Transmission Control Protocol) session, and it is hard for an application to cope with the method.

In a conventional mobile communication system, load balancing using DNSs (Domain Name Systems) 51 to 53, as shown in FIG. 18, is proposed as a method of dynamically selecting a server. According to this method, however, inquiries to the DNS 53 having servers 1-1 to 1-3 are made at many stages, the position of the mobile node 3 is concealed, and no optimal server can be selected. An optimal server can be selected in only the same domain managed by the DNS 51 which can directly communicate with the mobile node 3.

As described above, regardless of the DNS method or the method using a load balancer which typifies a general-purpose server, the conventional load distribution method can distribute the load by only a predetermined server function. Another server function cannot be provided to another user.

SUMMARY OF THE INVENTION

It is an object of the present invention to make it possible to select a server optimal for the destination of a mobile node.

A mobile communication system according to the present invention comprises a management agent which manages a destination of a mobile node, a server which serves as a communication partner of the mobile node, and a temporary server which has a network function equivalent to a network function of the server, the management agent comprising a position registration unit which registers position information of the destination of the mobile node when the mobile node moves, and a server function relocation unit which sets the temporary server as the communication partner of the mobile node instead of the server.

A management agent apparatus according to the present invention comprises a position registration unit which registers position information of a destination of a mobile node when the mobile node moves, and a server function relocation unit which sets, as a communication partner of the mobile node, a temporary server having a network function equivalent to a network function of a server, instead of the server serving as the communication partner of the mobile node.

A server function moving method according to the present invention comprises the steps of, when a mobile node moves, registering position information of a destination in a management agent which manages the destination of the mobile node, and setting, as a communication partner of the mobile node, a temporary server having a network function equivalent to a network function of a server, instead of the server serving as the communication partner of the mobile node.

BRIEF DESCRIPTION OF THE DRAWINGS

FIG. 15 is a sequence chart showing a network connection method based on SIP;

DESCRIPTION OF THE PREFERRED EMBODIMENTS

Figure 1:
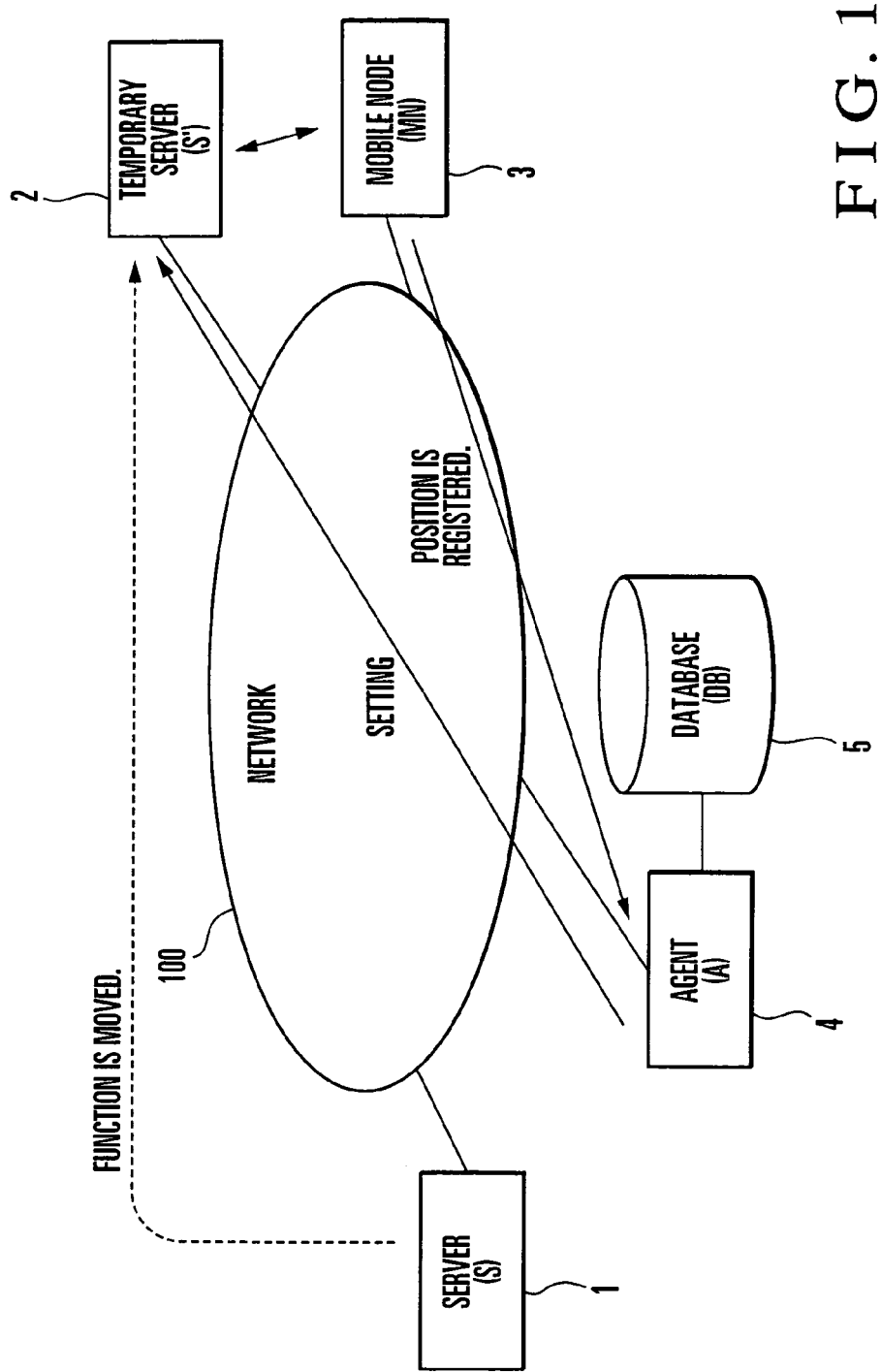
FIG. 1 is a block diagram showing the configuration of a mobile communication system according to an embodiment of the present invention.

An embodiment of the present invention will be described with reference to FIG. 1. In FIG. 1, a mobile communication system according to the embodiment comprises a server (S) 1, temporary server (S') 2, mobile node (MN) 3, agent (A) 4, and database (DB) 5. The server 1, temporary server 2, mobile node 3, and agent 4 are connected to a network 100.

According to the embodiment, in a system in which, when the mobile node 3 moves, the position of the mobile node 3 is registered in the agent 4 serving as a management agent for managing the destination, the agent 4 sets the temporary server 2 at a location suitable for the mobile node 3 as if the temporary server 2 were the server 1, and causes the temporary server 2 to communicate with the mobile node 3 instead of the server 1.

This configuration can select a server optimal for the destination of the mobile node 3, i.e., the temporary server 2 at the destination that has a small transmission delay, high throughput, and short response time and can provide information corresponding to the destination.

Figure 2:
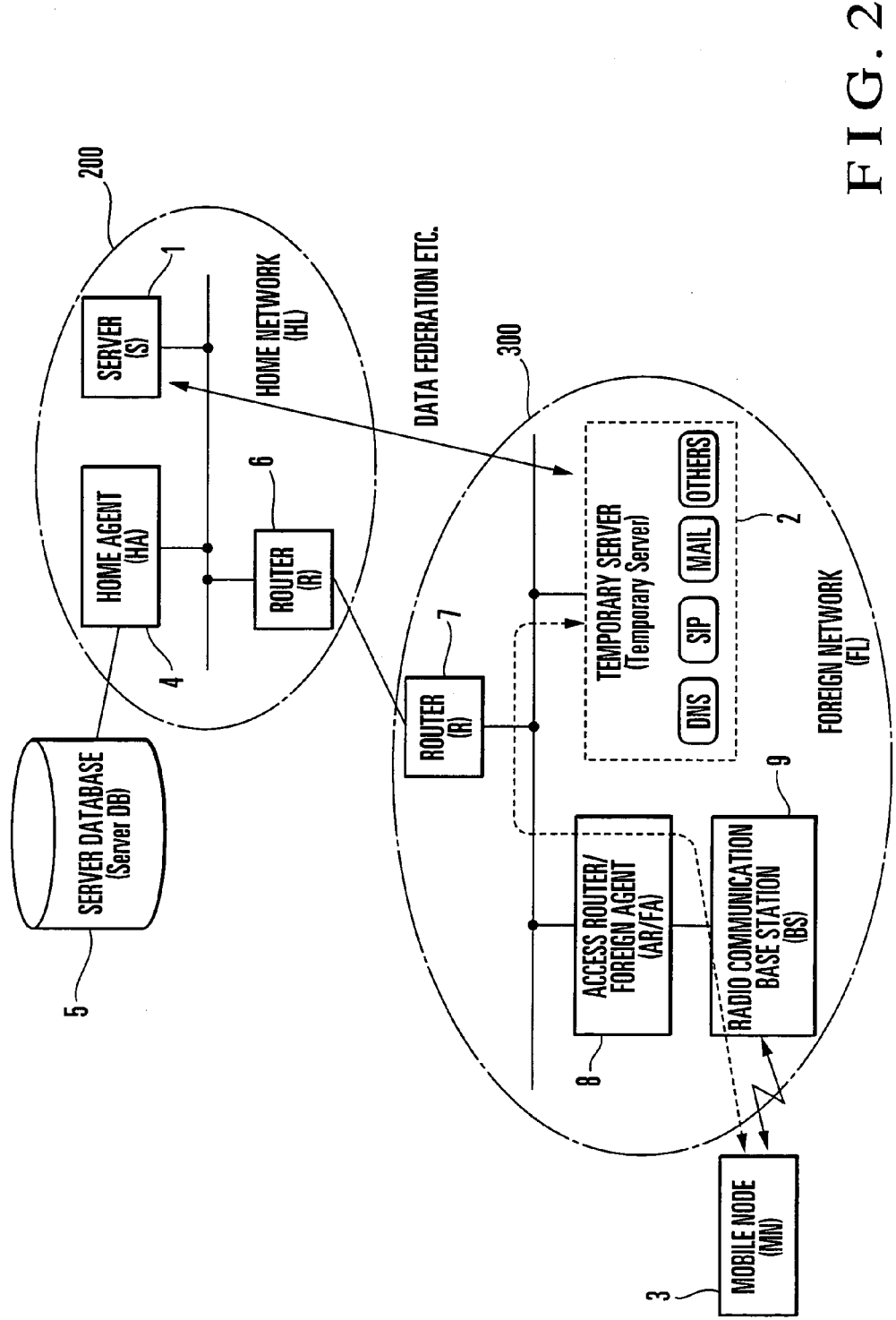
FIG. 2 is a block diagram showing the configuration of a mobile communication system according to the first embodiment of the present invention.

The first embodiment of the present invention will be described. In FIG. 2, a mobile communication system according to the first embodiment of the present invention is comprised of a home network (HL) 200 and foreign network (FL) 300.

In the home network 200, a home agent (HA) 4 serving as a Mobile IP (Internet Protocol) management agent, a server (S) 1 serving as a communication partner of a mobile node (MN) 3, and a router (R) 6 are installed. The home agent 4 is connected to a server database 5 which manages a list of at least one temporary server 2 serving as a proxy of the server 1. The server database 5 contains position information of the temporary server 2, e.g., prefix information of the temporary server 2.

In the foreign network 300, a router (R) 7, an access router/foreign agent (AR/FA) 8, a radio communication base station (BS) 9, and the temporary server 2 for communicating with the mobile node 3 instead of the server 1 are installed. A plurality of networks 300 may exist, or a plurality of temporary servers 2 may be set in one network 300.

The home network 200 and foreign network 300 are connected to each other via the routers 6 and 7.

Figure 3:
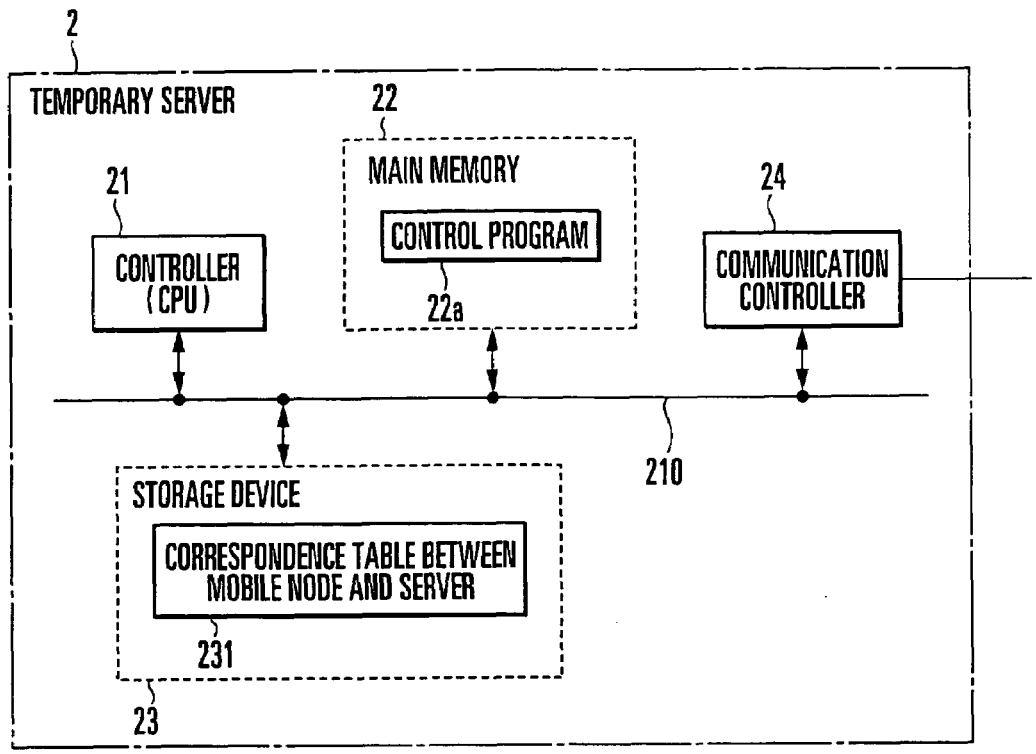
FIG. 3 is a block diagram showing the configuration of a temporary server in FIG. 2.

As shown in FIG. 3, the temporary server 2 in FIG. 2 is formed from a controller (CPU: Central Processing Unit) 21, a main memory 22 which stores a control program 22a executed by the controller 21, a storage device 23 which stores a correspondence table 231 between the mobile node 3 and the server 1, and a communication controller 24 which controls communication. The controller 21, main memory 22, storage device 23, and communication controller 24 are connected to each other via an internal bus 210. The temporary server 2 has network functions equivalent to those of the server 1.

Figure 4:
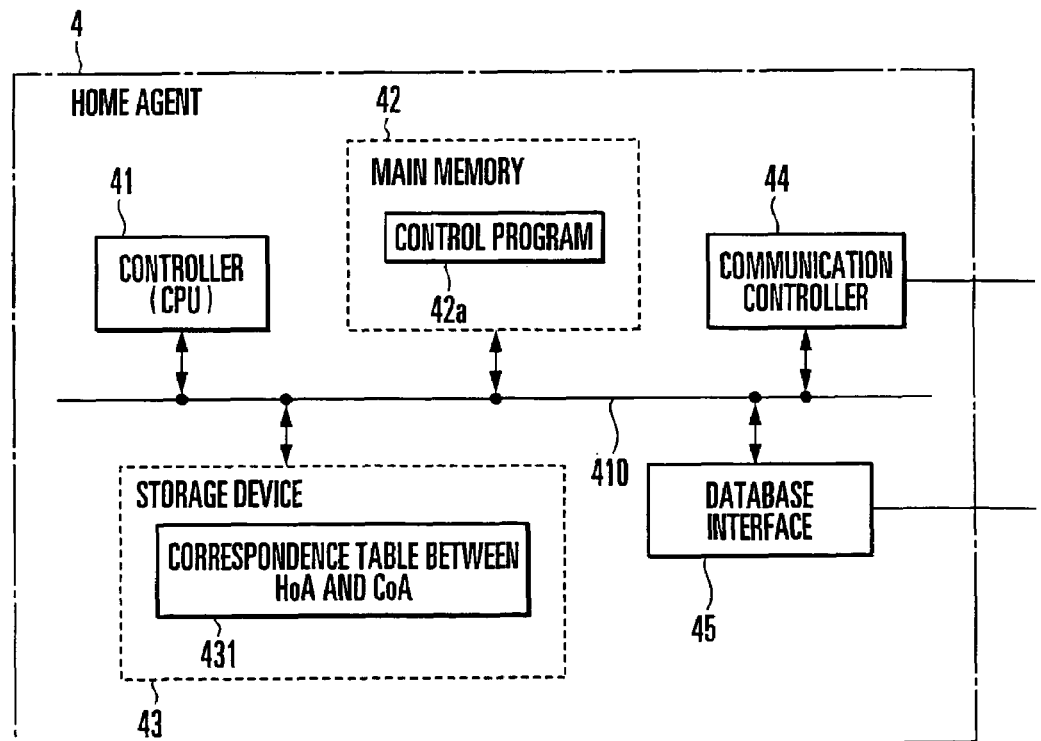
FIG. 4 is a block diagram showing the configuration of a home agent in FIG. 2.

As shown in FIG. 4, the home agent 4 in FIG. 2 is formed from a controller (CPU) 41, a main memory 42 which stores a control program 42a executed by the controller 41, a storage device 43 which stores a correspondence table 431 between the home address HoA of the mobile node 3 and the care-of address CoA of the foreign network 300, a communication controller 44 which controls communication, and a database interface 45 for communicating data with the server database 5. The controller 41, main memory 42, storage device 43, communication controller 44, and database interface 45 are connected to each other via an internal bus 410.

Figure 5:
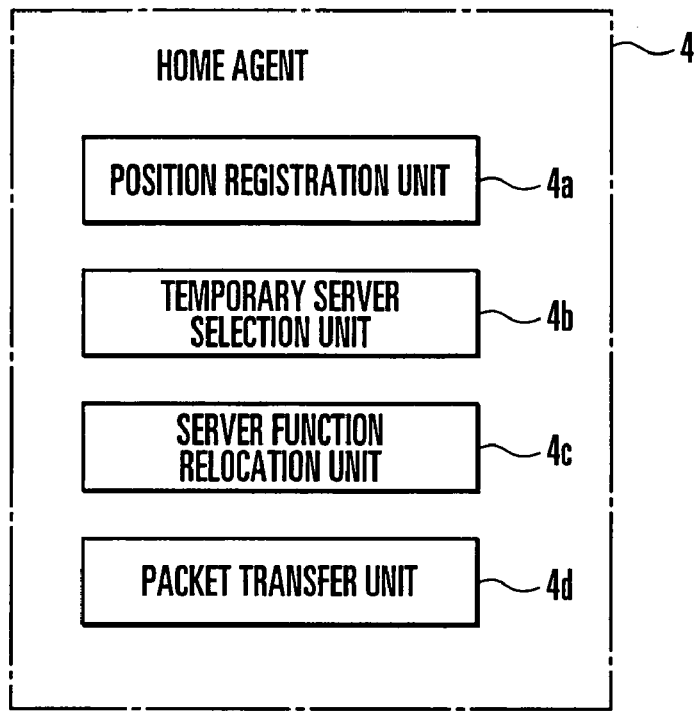
FIG. 5 is a functional block diagram showing the home agent in FIG. 2.

The controller 21 executes the control program 22a to implement a position registration unit 4a, temporary server selection unit 4b, server function relocation unit 4c, and packet transfer unit 4d in the home agent 4, as shown in FIG. 5.

The position registration unit 4a registers position information of the destination of the mobile node 3 when the mobile node 3 moves. More specifically, the position registration unit 4a performs processes a3 and a4 in FIG. 7 and processes b3 and b4 in FIG. 9 (to be described later).

The temporary server selection unit 4b selects, as the temporary server 2, one of temporary server candidates managed by the server database 5 in accordance with the destination of the mobile node 3. More specifically, the temporary server selection unit 4b performs a process a5 in FIG. 7, processes b5 and b6 in FIG. 9, and steps S1 to S3 in FIG. 10 (to be described later).

The server function relocation unit 4c sets the temporary server 2 selected by the temporary server selection unit 4b to be a communication partner of the mobile node 3, instead of the server 1. More specifically, the server function relocation unit 4c performs a process a6 in FIG. 7 and a process b7 in FIG. 9 (to be described later).

When the mobile node 3 communicates with the server 1, the packet transfer unit 4d receives a packet transmitted from the mobile node 3 to the server 1, and transfers the packet to the temporary server 2. More specifically, the packet transfer unit 4d performs a process a10 in FIG. 7 and a process b11 in FIG. 9 (to be described later).

Figure 6:
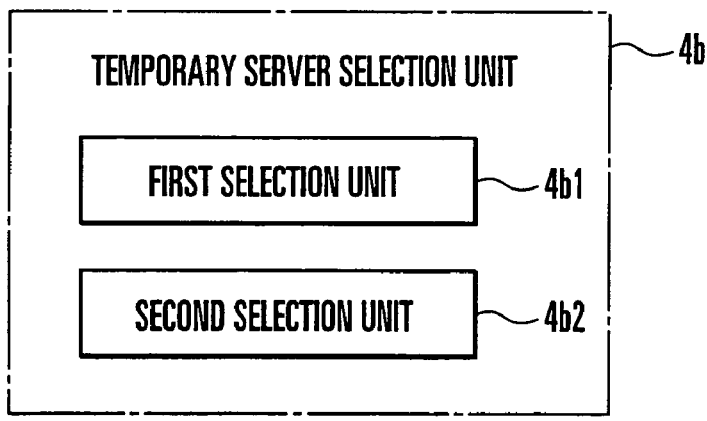
FIG. 6 is a functional block diagram showing a temporary server selection unit in FIG. 5.

The temporary server selection unit 4b includes first and second selection units 4b1 and 4b2 shown in FIG. 6.

The first selection unit 4b1 selects the temporary server 2 by comparing position information of the destination of the mobile node 3 with pieces of position information of temporary servers that are managed by the server database 5. More specifically, the first selection unit 4b1 performs a process a5 in FIG. 7 (to be described later).

The second selection unit 4b2 selects the temporary server by performing a route finding process based on ICMP (Internet Control Message Protocol). More specifically, the second selection unit 4b2 performs processes b5 and b6 in FIG. 9 and steps S1 to S3 in FIG. 10 (to be described later).

Operation of the mobile communication system according to the first embodiment will be explained with reference to FIGS. 2 to 7. Note that processes by the temporary server 2 and home agent 4 shown in FIG. 7 are implemented by executing the control programs 22a and 42a by the controllers 21 and 41.

Figure 7:
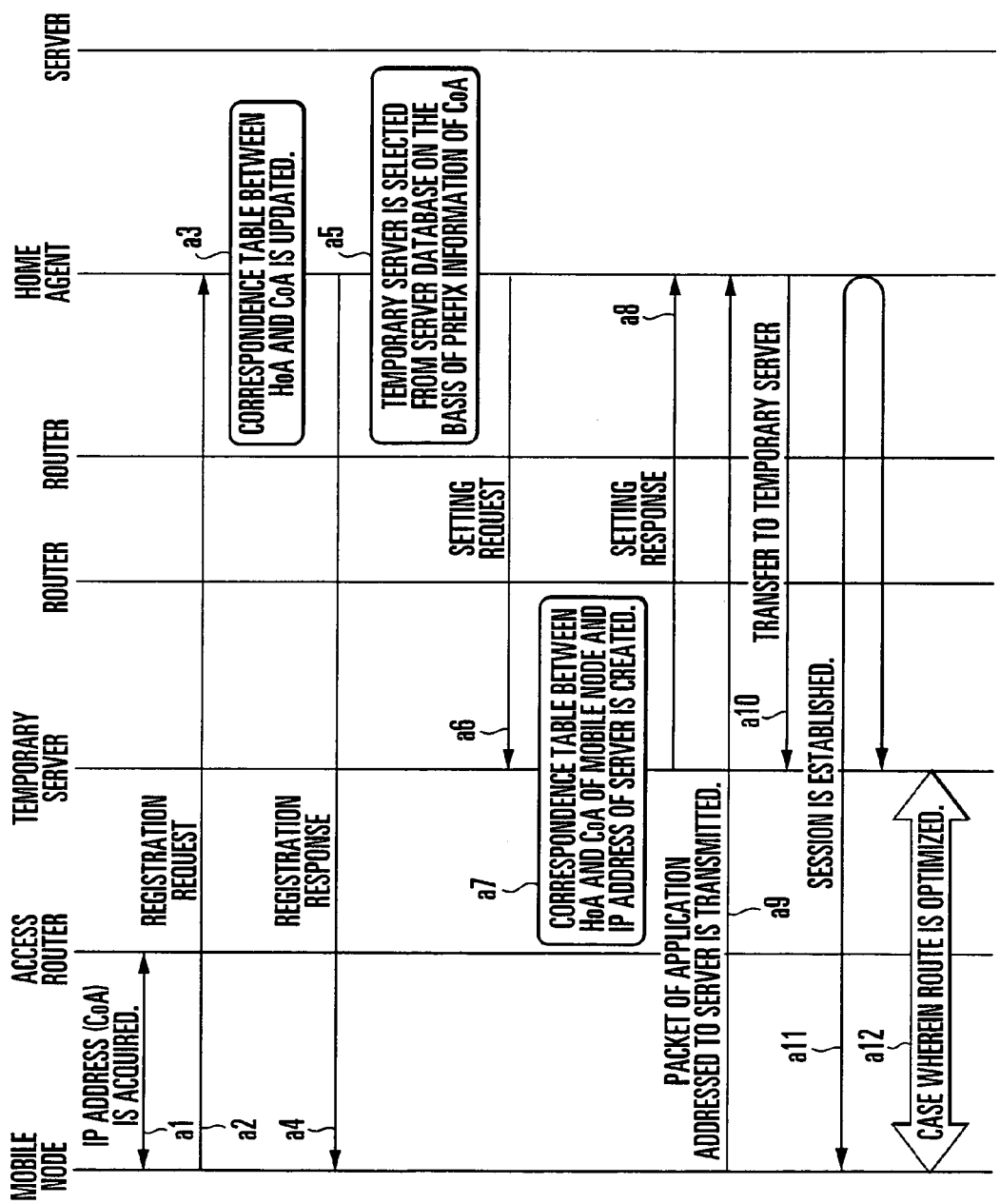
FIG. 7 is a sequence chart showing operation of the mobile communication system according to the first embodiment of the present invention.

In Mobile IP, when the mobile node 3 is connected to the foreign network 300, it acquires the care-of address CoA of the foreign network 300 from the access router/foreign agent 8 (a1 in FIG. 7), and requests the home agent 4 to register the position of the mobile node 3 (a2 in FIG. 7). The home agent 4 registers the home address HoA and CoA of the mobile node 3 in the correspondence table 431 (a3 in FIG. 7), and sends back a registration response to the mobile node 3 (a4 in FIG. 7).

The home agent 4 extracts prefix information from the CoA, performs matching between the extracted prefix information and pieces of prefix information of temporary server candidates that are managed by the server database 5, and selects the temporary server 2 from the candidates (a5 in FIG. 7). The home agent 4 notifies the selected temporary server 2 of the HoA and CoA of the mobile node 3 and the IP address of the server 1, and issues a setting request so that the temporary server 2 operates as the server 1 for the mobile node 3 (a6 in FIG. 7).

The temporary server 2 creates the correspondence table 231 between the mobile node 3 and the server 1 on the basis of the notified HoA and CoA of the mobile node 3 and the IP address of the server 1 (a7 in FIG. 7), and sends back a setting response to the home agent 4 (a8 in FIG. 7). The temporary server 2 uses the notified IP address of the server 1 as the home address of the server 1, and the IP address of the temporary server 2 itself as the care-of address of the server 1. The mobile node 3 executes communication in accordance with these settings.

When the mobile node 3 communicates with the server 1, a packet addressed to the server 1 is transmitted to the home agent 4 (a9 in FIG. 7), and transferred from the home agent 4 to the temporary server 2 (a10 in FIG. 7). In order to operate as the server 1 for the mobile node 3, the temporary server 2 establishes a session (a11 in FIG. 7). The mobile node 3 and temporary server 2 communicate with each other via the shortest route through the Mobile IP route optimization procedure (a12 in FIG. 7)

Figure 8:
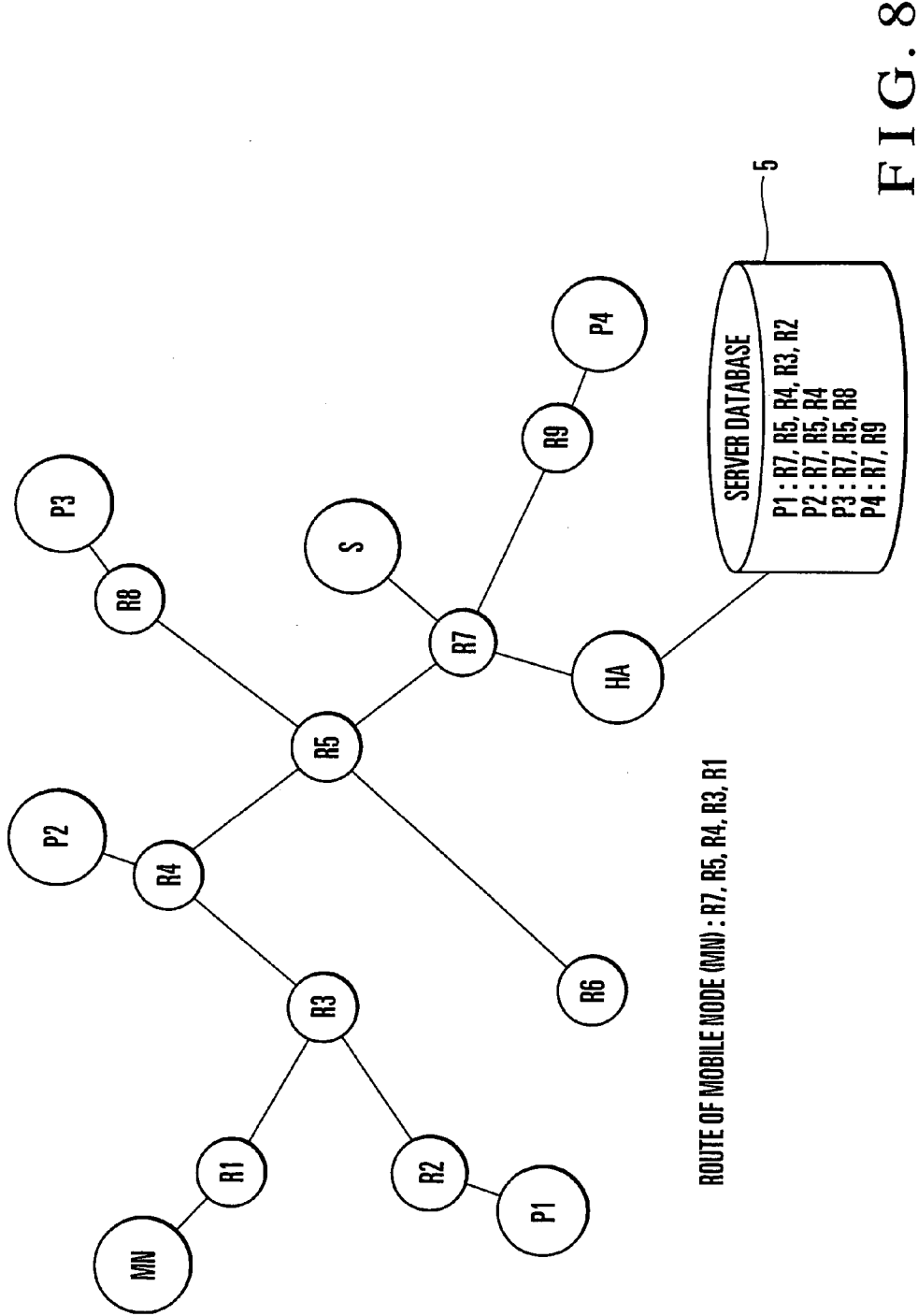
FIG. 8 is a view for explaining a route finding process according to the first embodiment of the present invention.

Operation when no temporary server 2 can be selected from prefix information in the mobile communication system according to the first embodiment will be explained with reference to FIGS. 8 to 10. Note that processes by the temporary server 2 in FIG. 9, and processes by the home agent 4 in FIGS. 9 and 10 are implemented by executing the control programs 22a and 42a by the controllers 21 and 41.

If no temporary server 2 can be selected from prefix information in selecting the temporary server 2, the following procedures are executed. In FIG. 8, reference symbols P1 to P4 denote node devices serving as candidates of the temporary server 2. In a network in which the node devices P1 to P4 are connected by routers R1 to R9, the mobile node (MN) 3, home agent (HA) 4, and server (S) 1 are arranged.

The route from the home agent HA to each temporary server is determined by an ICMP route finding process which is a conventional method in the Internet. Determined route information is recorded in the server database 5 together with position information of each server.

Figure 9:
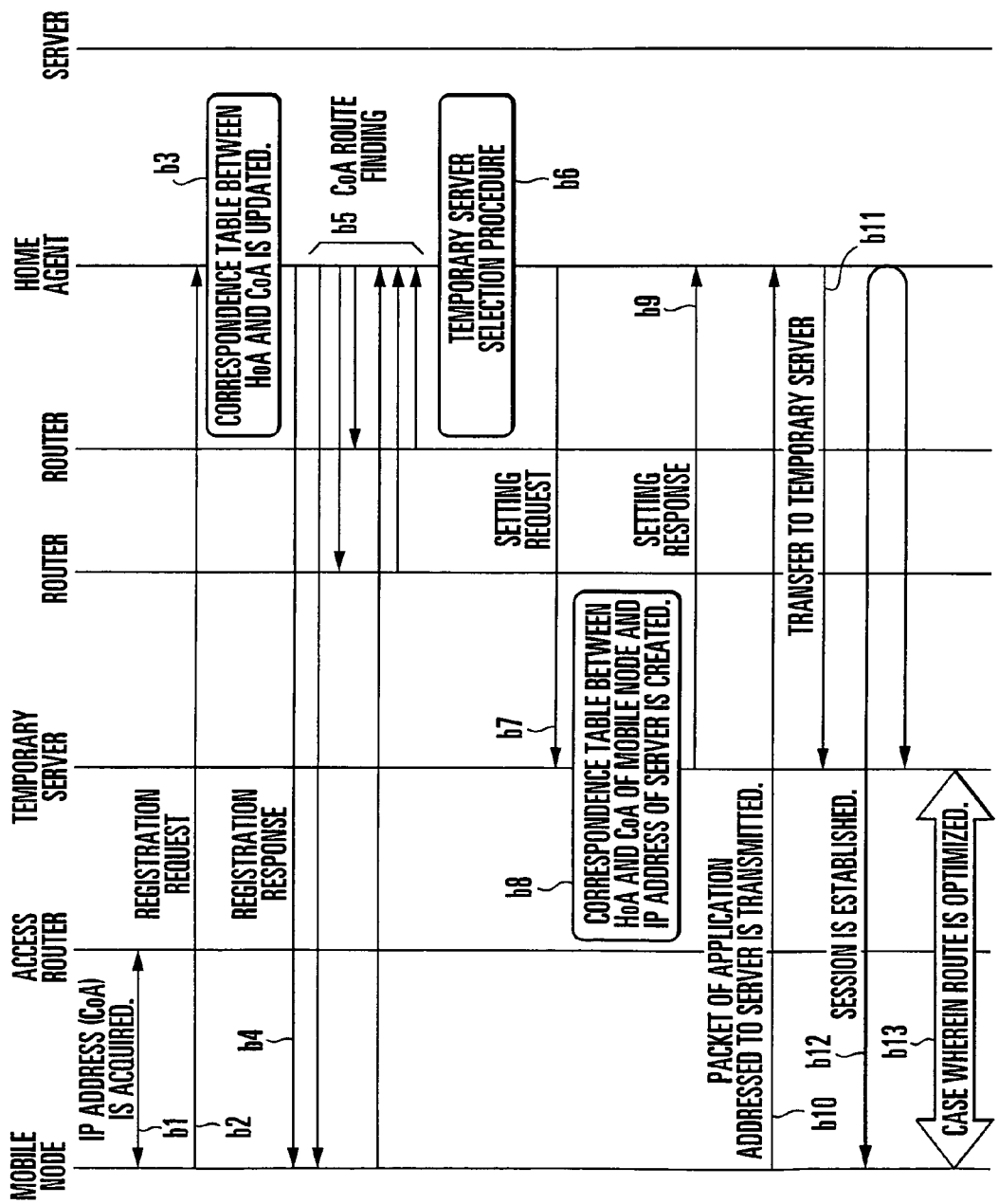
FIG. 9 is a sequence chart showing operation when no temporary server can be selected from prefix information in the mobile communication system according to the first embodiment of the present invention.
Figure 10:
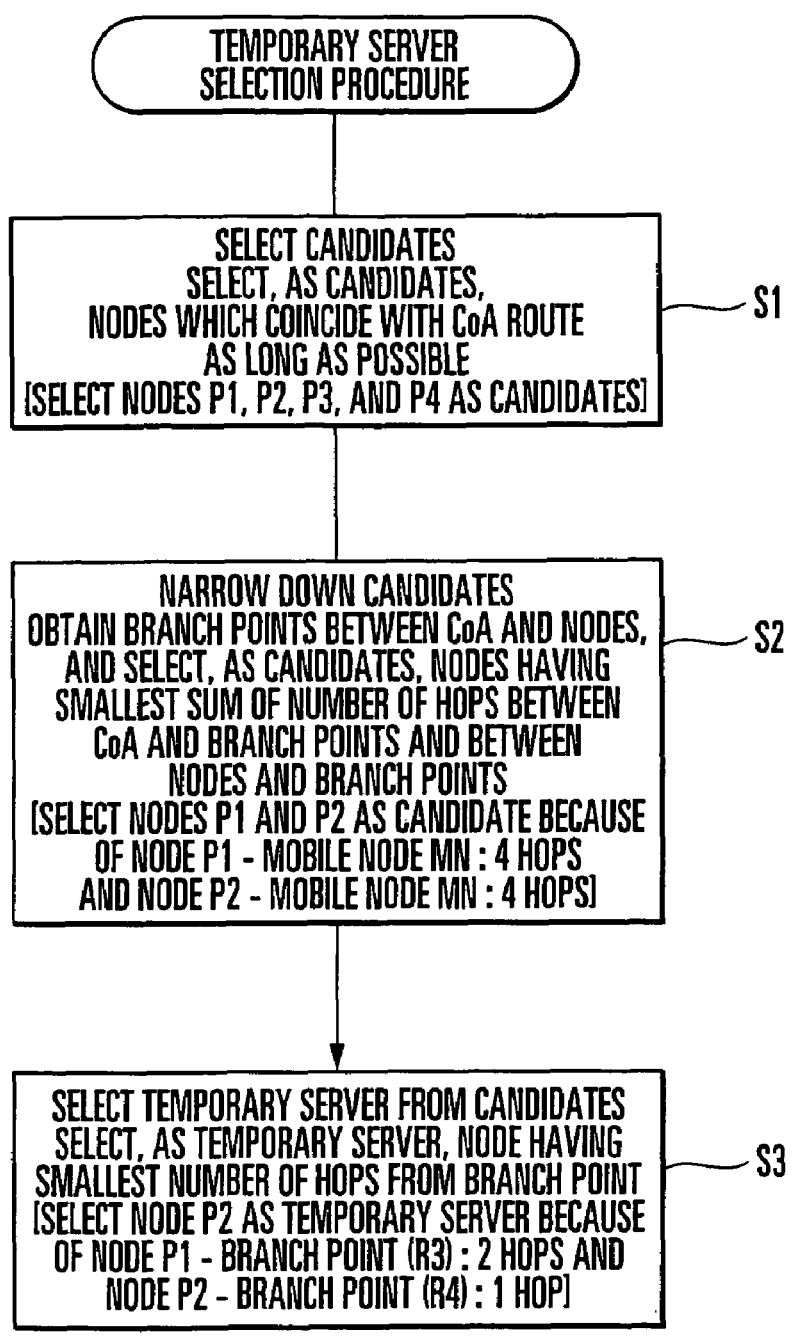
FIG. 10 is a flowchart showing a temporary server selection procedure in FIG. 9.

After the mobile node 3 registers its position in the home agent 4 (b1 to b4 in FIG. 9), the home agent 4 performs CoA route finding by transmitting a packet for ICMP route finding to the CoA of the mobile node 3 (b5 in FIG. 9). In route finding, the route is generally detected by increasing the hop limit of packets one by one, but a long time is taken for this method. A sequence number contained in ICMP is generally contained in a response message, and thus the route may be analyzed from a response by transmitting packets at once.

The home agent 4 selects the temporary server 2 by the temporary server selection procedure (b6 in FIG. 9). In this case, the home agent 4 selects node devices at which routes overlap, as candidates of the temporary server 2 on the basis of the routes of the node devices P1 to P4 that are obtained in advance, and routes to the CoA (step S1 in FIG. 10).

The home agent 4 obtains branch points between the CoA and the node devices P1 to P4, and sets, as candidates of the temporary server 2, the node devices P1 and P2 having the smallest sum among the sums of the numbers of hops between the CoA and branch points and between the node devices P1 to P4 and branch points (step S2 in FIG. 10). Finally, the home agent 4 selects, as the temporary server 2, the node device P2 having the smallest number of hops from the branch point (step S3 in FIG. 10).

The home agent 4 can also transmit directly to the mobile node 3 a setting request to update the correspondence table of the mobile node 3 so as to change a network route extending to the server 1 to that extending to the temporary server 2.

In this case, packets addressed to the server 1 are directly transmitted from the mobile node 3 to the temporary server 2. Since the temporary server 2 is set to operate as the server 1 for the mobile node 3, it directly responds to the mobile node 3 and establishes a session. The route at this time is set by the same mechanism as route optimization by Mobile IP. Note that b7 to b13 in FIG. 9 are identical to a6 to a12 in FIG. 7.

When the home network 200 and foreign network 300 are away from each other and the mobile node 3 directly communicates with the server 1, the communication speed decreases owing to the transmission delay between them. However, transmission via a relay server is known to increase the throughput and shorten the response time.

In the first embodiment, the temporary server 2 optimal for the destination of the mobile node 3 can be selected by the above configuration and operation, and a relay server can be seamlessly set for the mobile node 3.

In the first embodiment, the temporary server 2 optimal for the destination of the mobile node 3 can be selected by the above configuration and operation. When the mobile node 3 tries to communicate with an information providing server at a destination that is compatible with the destination, an optimal foreign server, i.e., the temporary server 2 at the destination that has a small transmission delay, high throughput, and short response time and can provide information corresponding to the destination can be selected.

The second embodiment of the present invention will be described. In a mobile communication system by a mobile management method based on SIP (Session Initiation Protocol) according to the second embodiment of the present invention in FIG. 11, an SIP server 11 having a registration function and serving as a management agent is installed in a home network (HL) 400, and an SIP server (proxy) 15 is installed in a foreign network (FL) 500.

The home network 400 has a server (SIP client) 12 serving as a communication partner of a mobile node 3. An SIP client database (SIP client DB) 13 which manages a list of candidates of a temporary server (temporary SIP client) 14 in the foreign network 500 is connected to the SIP server 11.

The foreign network 500 has the temporary server 14. Similar to the mobile communication system according to the first embodiment of the present invention described above, the home network 400 and foreign network 500 are connected by routers 6 and 7, and this network is a general one.

Figure 11:
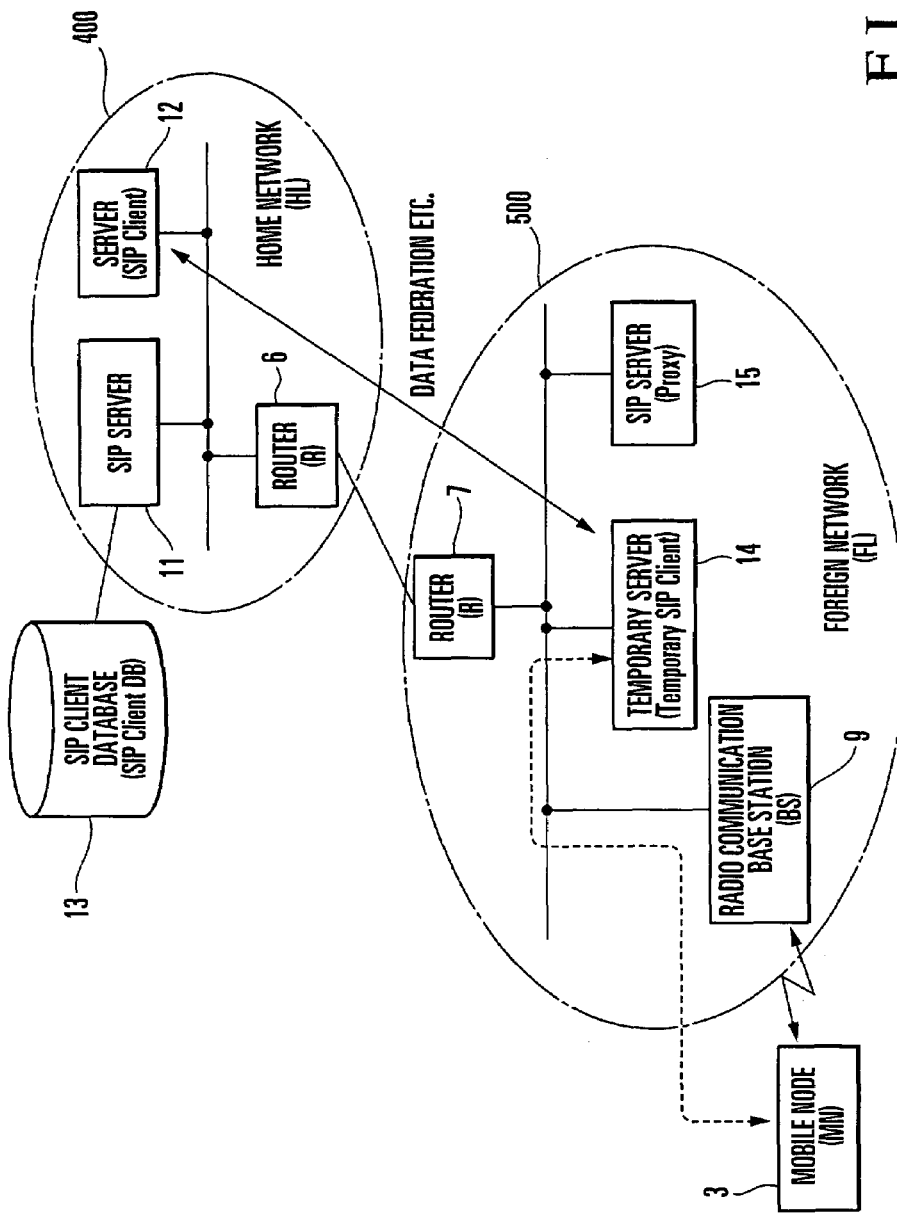
FIG. 11 is a block diagram showing the configuration of a mobile communication system according to the second embodiment of the present invention.

Operation of the mobile communication system according to the second embodiment will be explained with reference to FIGS. 11 and 12. The temporary server 14 and SIP server 11 shown in FIG. 12 have the same configurations as those of the temporary server 2 and home agent 4 described above. Processes by the temporary server 14 and SIP server 11 shown in FIG. 12 can be implemented by executing control programs by their controllers.

Figure 12:
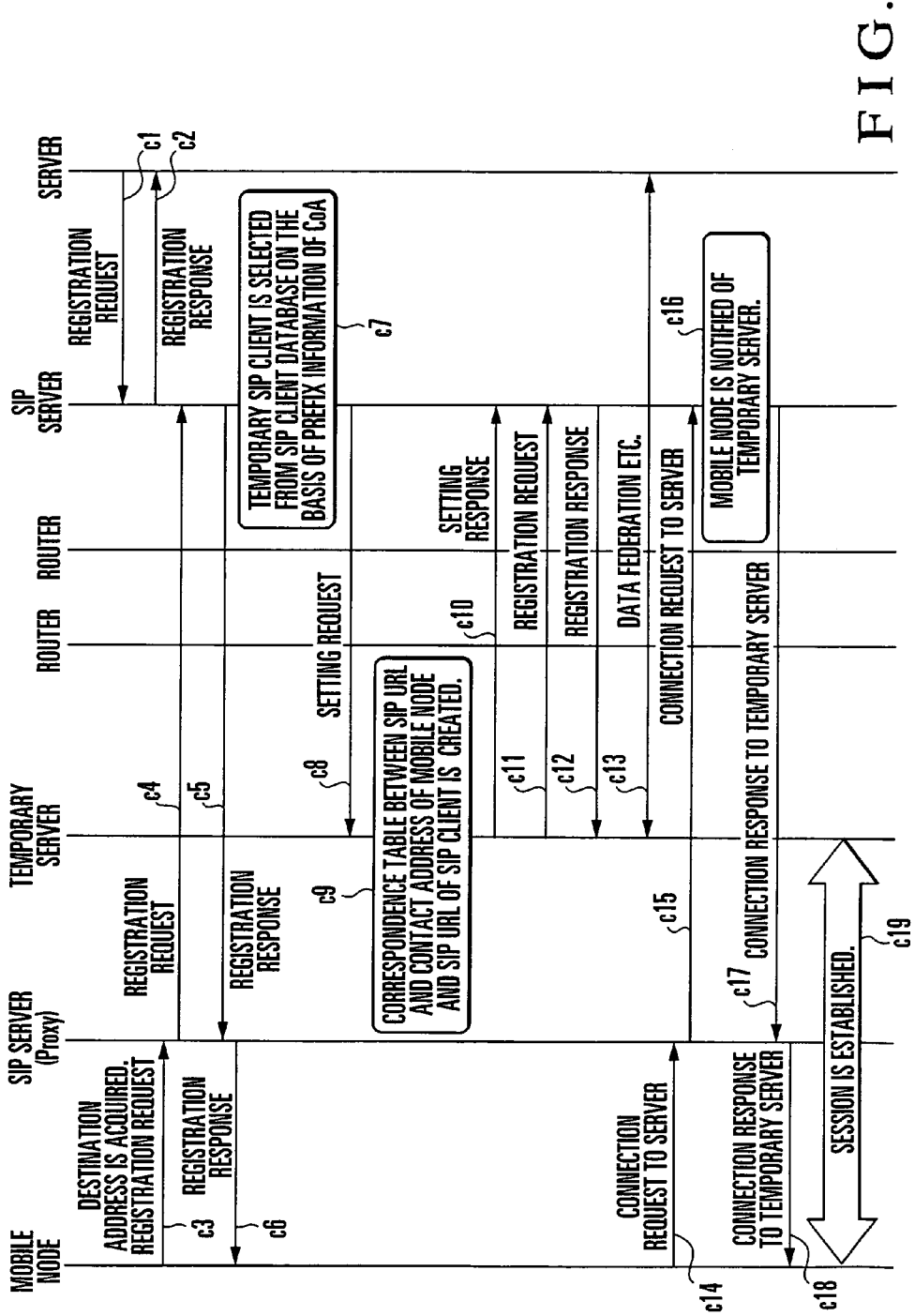
FIG. 12 is a sequence chart showing operation of the mobile communication system according to the second embodiment of the present invention.

In the SIP mobile management method, the mobile node 3 acquires an address in the foreign network 500, transmits a registration request via the SIP server (proxy) 15, and registers the destination address in the SIP server 11 having the registration function (c3 to c6 in FIG. 12). The server (SIP client) 12 serving as a communication partner is separately registered in the SIP server 11 (c1 and c2 in FIG. 12).

The SIP server 11 selects the temporary server (temporary SIP client) 14 from the SIP client database 13 on the basis of prefix information of the destination address CoA of the mobile node 3 (c7 in FIG. 12).

The SIP server 11 transmits the SIP URL (Uniform Resource Locator) and CoA of the mobile node 3 and the SIP URL of the server (SIP client) 12 to the temporary server (temporary SIP client) 14 (c8 in FIG. 12).

The temporary server (temporary SIP client) 14 creates a correspondence table between the SIP URL (Uniform Resource Locator) and CoA of the mobile node 3 and the SIP URL of the server (SIP client) 12 on the basis of the SIP URLs and CoA which have been transmitted from the SIP server 11 (c9 in FIG. 12), and sends back a setting response to the SIP server 11 (c10 in FIG. 12).

The temporary server (temporary SIP client) 14 performs a registration process for the SIP server 11 so that the temporary server (temporary SIP client) 14 operates as the server (SIP client) 12 for only the mobile node 3 (c11 and c12 in FIG. 12). The temporary server (temporary SIP client) 14 may execute a data federation procedure with the server (SIP client) 12 (c13 in FIG. 12), which is not defined in this embodiment.

When the mobile node 3 requests connection to the server (SIP client) 12, the request reaches the SIP server 11 via the SIP server (proxy) 15 (c14 and c15 in FIG. 12). Because of the request from the mobile node 3, the SIP server 11 sends back the address of the temporary server (temporary SIP client) 14 (c16 to c18 in FIG. 12). The mobile node 3 establishes a session with the temporary server (temporary SIP client) 14, and starts communication (c19 in FIG. 12).

Operation of a mobile communication system according to the third embodiment of the present invention will be described with reference to FIG. 13. In the mobile communication system according to the third embodiment, a mobile node and server (SIP client) are separately managed by the SIP server of the mobile node and that of the server.

Figure 13:
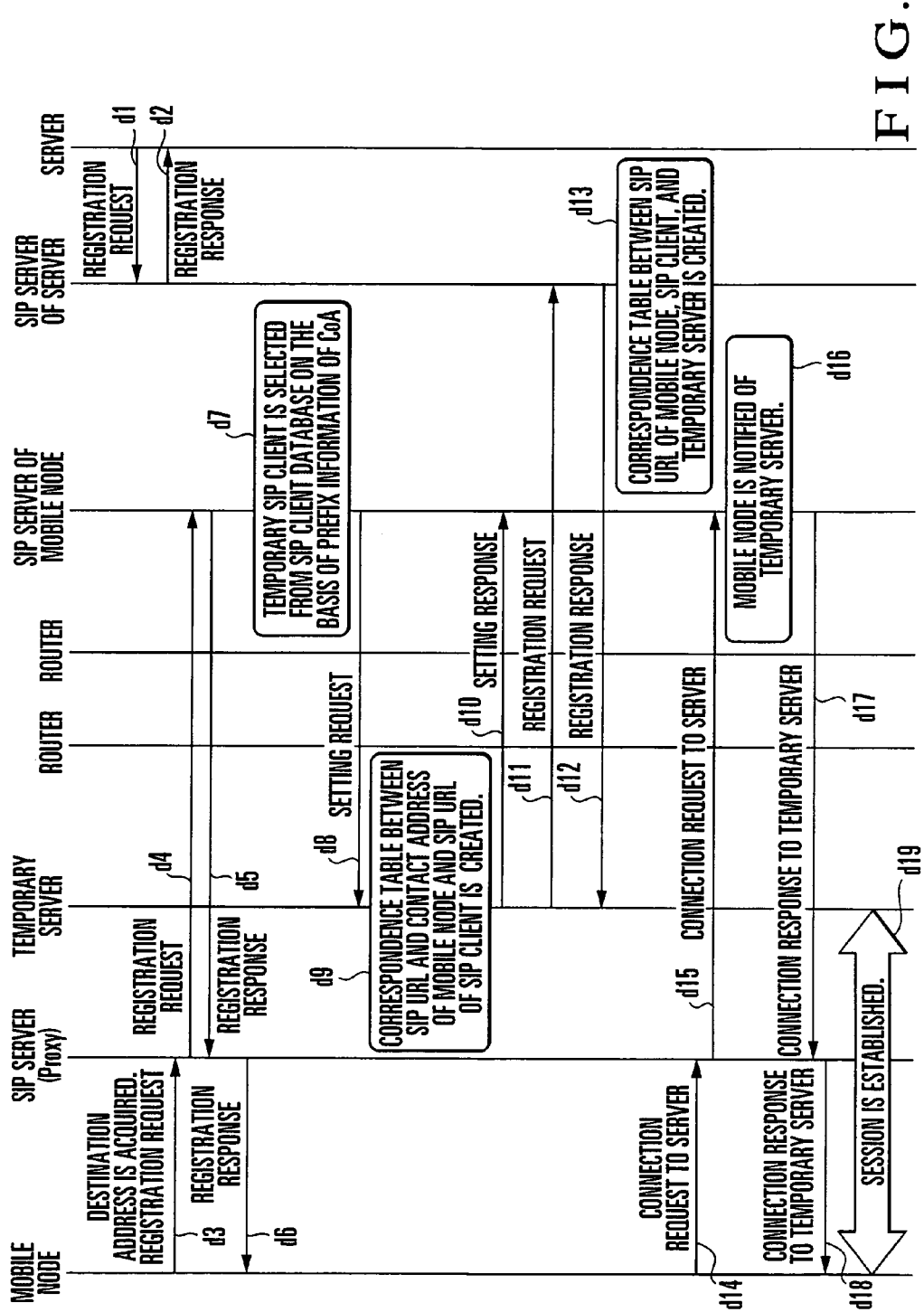
FIG. 13 is a sequence chart showing operation of a mobile communication system according to the third embodiment of the present invention.
Figure 14:
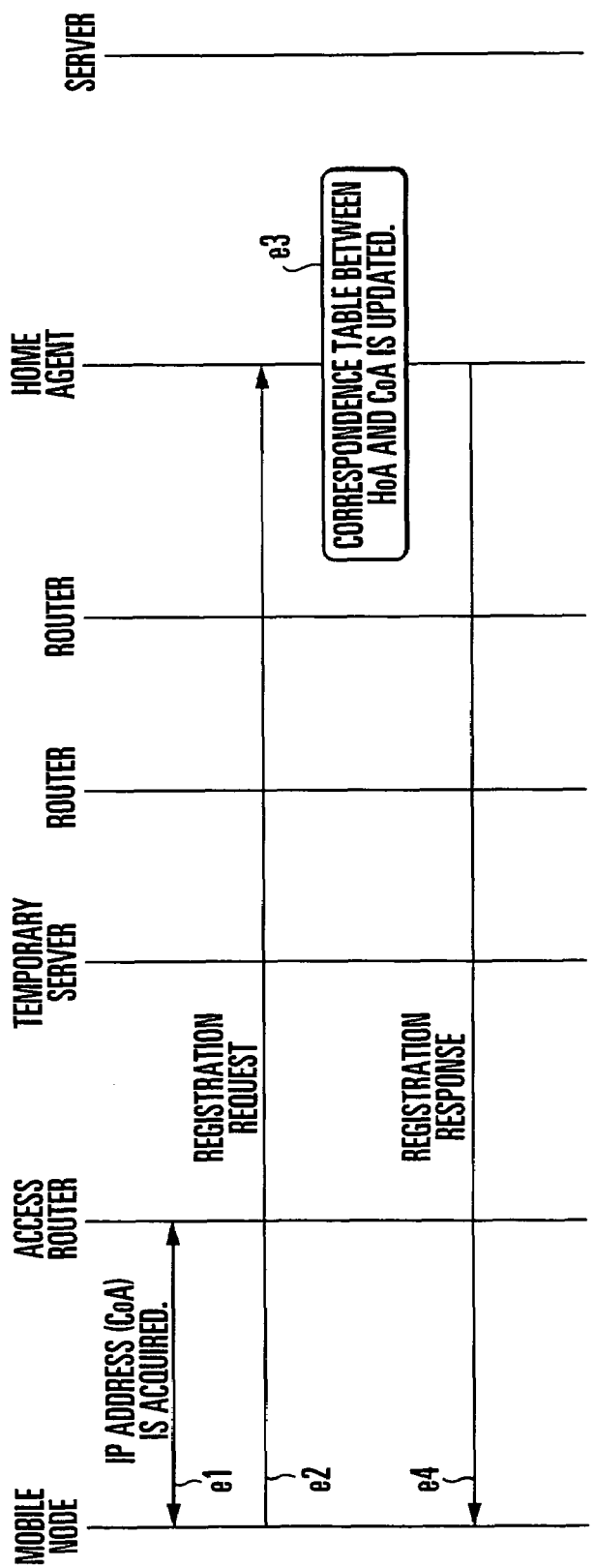
FIG. 14 is a sequence chart showing a network connection method based on Mobile IP.
Figure 16:
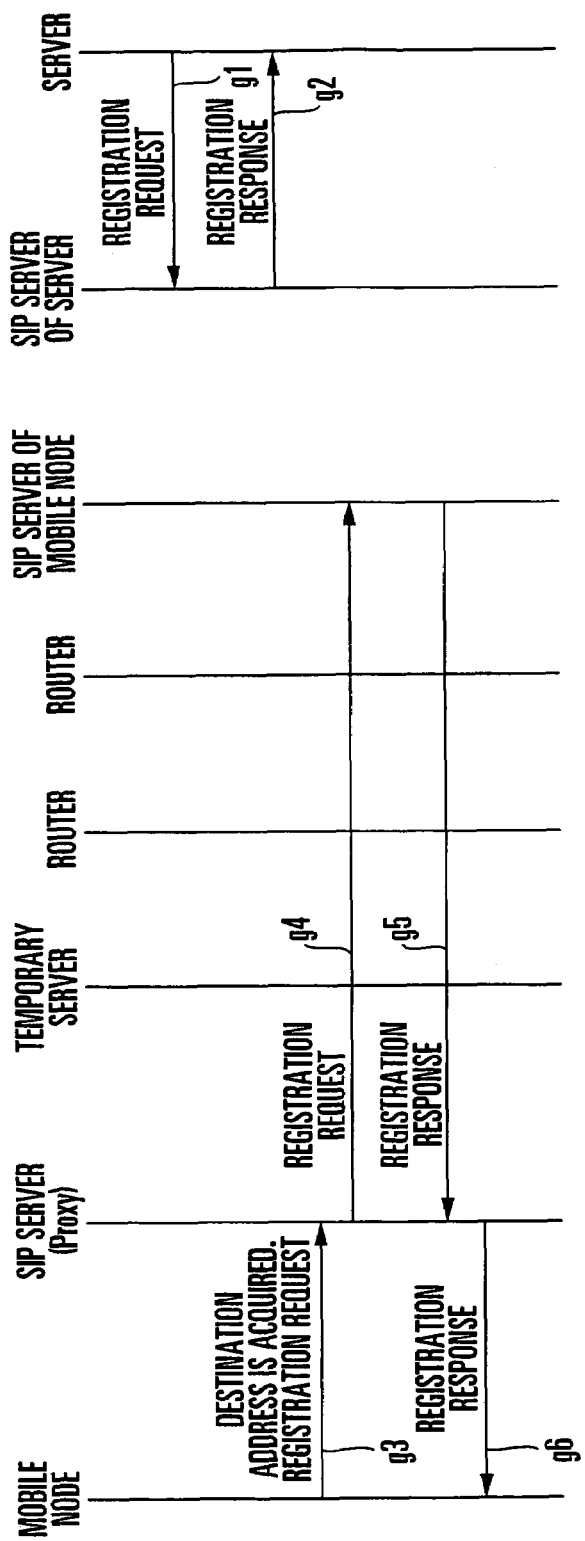
FIG. 16 is a sequence chart showing a network connection method when a mobile node and server are managed by separate SIP servers.
Figure 17:
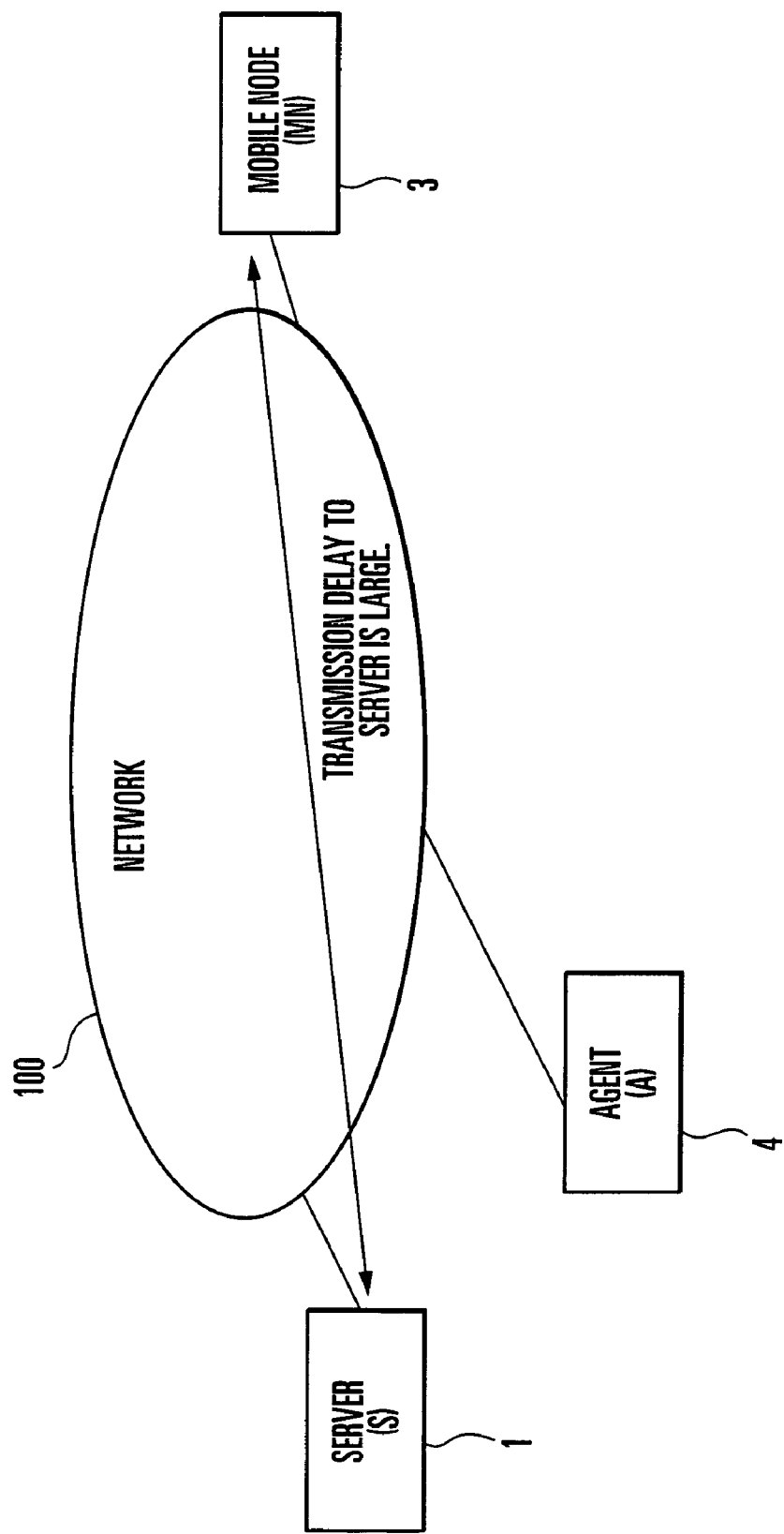
FIG. 17 is a block diagram showing the configuration of a conventional mobile communication system.
Figure 18:
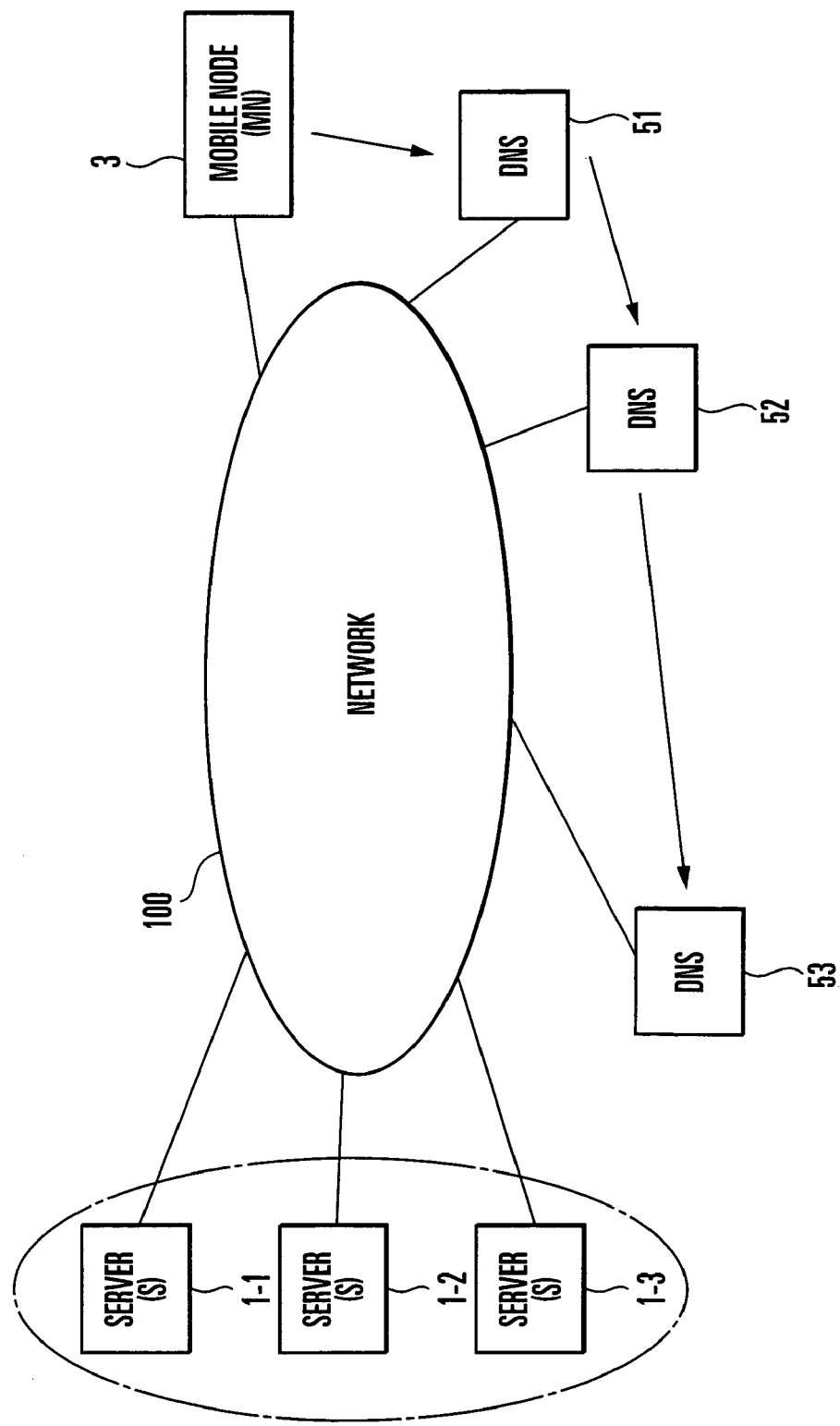
FIG. 18 is a block diagram showing another configuration of the conventional mobile communication system.

The SIP server of the server receives a registration request from the temporary server (temporary SIP client), and performs a registration process so that the temporary server (temporary SIP client) operates as the server (SIP client) for only the mobile node (d11 to d13 in FIG. 13).

In the third embodiment, the mobile node and server (SIP client) are separately managed by the SIP server of the mobile node and that of the server. Even in this case, when the mobile node issues a connection request to the server (SIP client), the SIP server of the server sends back the address of the temporary server (temporary SIP client), and thus a session is established between the mobile node and the temporary server (temporary SIP client) (d14 to d19 in FIG. 13).

What is claimed is:

1. A mobile communication system comprising:
    a management agent which manages a destination of a mobile node;
    a server which serves as a communication partner of the mobile node; and
    a temporary server which has a network function equivalent to a network function of said server,
    said management agent comprising
    a position registration unit which registers position information of the destination of said mobile node, and
    a server function relocation unit which sets said temporary server as the communication partner of said mobile node instead of said server.

2. A system according to claim 1, wherein said temporary server includes a plurality of temporary servers,
    said management agent further comprises a temporary server selection unit which selects one of said temporary servers in accordance with the destination of said mobile node, and
    said server function relocation unit sets said selected temporary server as the communication partner of said mobile node.

3. A system according to claim 2, further comprising a database which manages position information of said temporary server,
    wherein said temporary server selection unit comprises a first selection unit which selects said temporary server by comparing the position information of the destination of said mobile node with the position information of said temporary server that is managed by said database.

4. A system according to claim 2, wherein said temporary server selection unit comprises a second selection unit which selects said temporary server by performing a route finding process based on ICMP (Internet Control Message Protocol).

5. A system according to claim 1, wherein said temporary server exists at the destination of said mobile node.

6. A system according to claim 2, wherein said management agent and said server belong to a home network of said mobile node,
    said temporary server belongs to a network different from the home network, and
    said temporary server selection unit selects a temporary server belonging to a network at the destination of said mobile node.

7. A system according to claim 1, wherein said management agent includes a home agent of Mobile IP (Internet Protocol).

8. A system according to claim 1, wherein said management agent includes an SIP server having a registration function in a mobile management method based on SIP (Session Initiation Protocol).

9. A management agent apparatus comprising:
    a position registration unit which registers position information of a destination of a mobile node; and
    a server function relocation unit which sets, as a communication partner of the mobile node, a temporary server having a network function equivalent to a network function of a server, instead of the server serving as the communication partner of the mobile node.

10. An apparatus according to claim 9, further comprising a temporary server selection unit which, when a plurality of temporary servers exist, selects one of the temporary servers in accordance with the destination of the mobile node,
    wherein said server function relocation unit sets the selected temporary server as the communication partner of the mobile node.

11. An apparatus according to claim 10, wherein said temporary server selection unit comprises a first selection unit which selects the temporary server by comparing the position information of the destination of the mobile node with position information of the temporary server.

12. An apparatus according to claim 10, wherein said temporary server selection unit comprises a second selection unit which selects the temporary server by performing a route finding process based on ICMP (Internet Control Message Protocol).

13. An apparatus according to claim 9, wherein the temporary server exists at the destination of the mobile node.

14. An apparatus according to claim 9, wherein the management agent apparatus includes a home agent of Mobile IP (Internet Protocol).

15. An apparatus according to claim 9, wherein the management agent apparatus includes an SIP server having a registration function in a mobile management method based on SIP (Session Initiation Protocol).

16. A server function moving method comprising:
the step of registering position information of a destination in a management agent which manages the destination of the mobile node; and
the step of setting, as a communication partner of the mobile node, a temporary server having a network function equivalent to a network function of a server, instead of the server serving as the communication partner of the mobile node.

17. A method according to claim 16, further comprising the step of, when a plurality of temporary servers exist, selecting one of the temporary servers in accordance with the destination of the mobile node,
wherein in the setting step, the selected temporary server is set as the communication partner of the mobile node.

18. A method according to claim 17, wherein the selecting step comprises the step of selecting the temporary server by comparing the position information of the destination of the mobile node with position information of the temporary server that is managed by a database.

19. A method according to claim 17, wherein the selecting step comprises the step of selecting the temporary server by performing a route finding process based on ICMP (Internet Control Message Protocol).

20. A method according to claim 16, wherein the temporary server exists at the destination of the mobile node.

21. A method according to claim 16, wherein the management agent apparatus includes a home agent of Mobile IP (Internet Protocol).

22. A method according to claim 16, wherein the management agent apparatus includes an SIP server having a registration function in a mobile management method based on SIP (Session Initiation Protocol).

23. A computer-readable memory that stores a program for causing a computer to execute:
the step of registering position information of a destination in a management agent which manages the destination of the mobile node, and
the step of setting, as a communication partner of the mobile node, a temporary server having a network function equivalent to a network function of a server, instead of the server serving as the communication partner of the mobile node.

\* \* \* \* \*